Sept. 25, 1928. 1,685,300
J. T. TRAVERS
PROCESS AND APPARATUS FOR TREATING POLLUTED ACID WASTES
Filed June 21, 1927 2 Sheets-Sheet 2
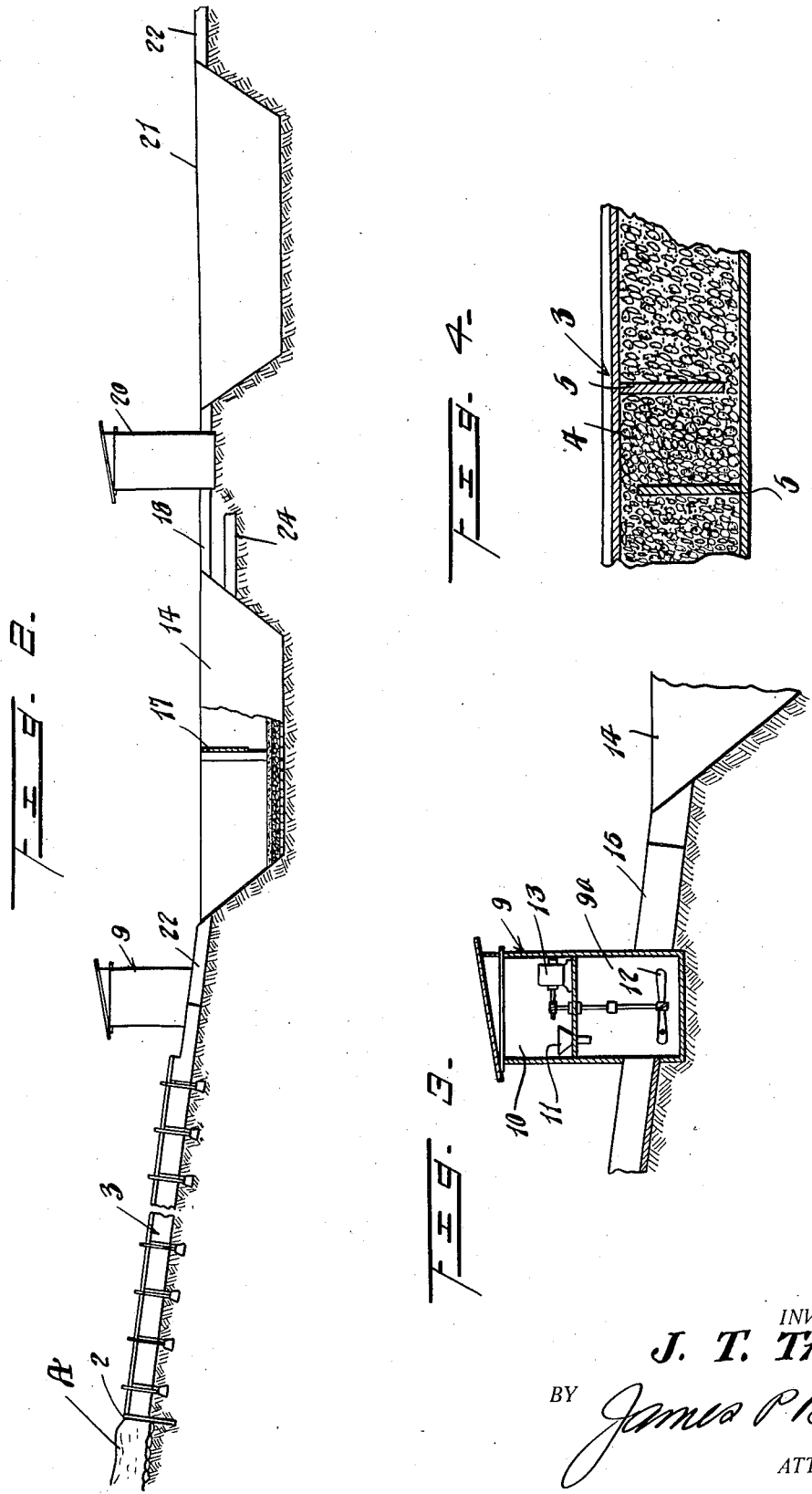
INVENTOR.
J. T. Travers.
BY
ATTORNEY.

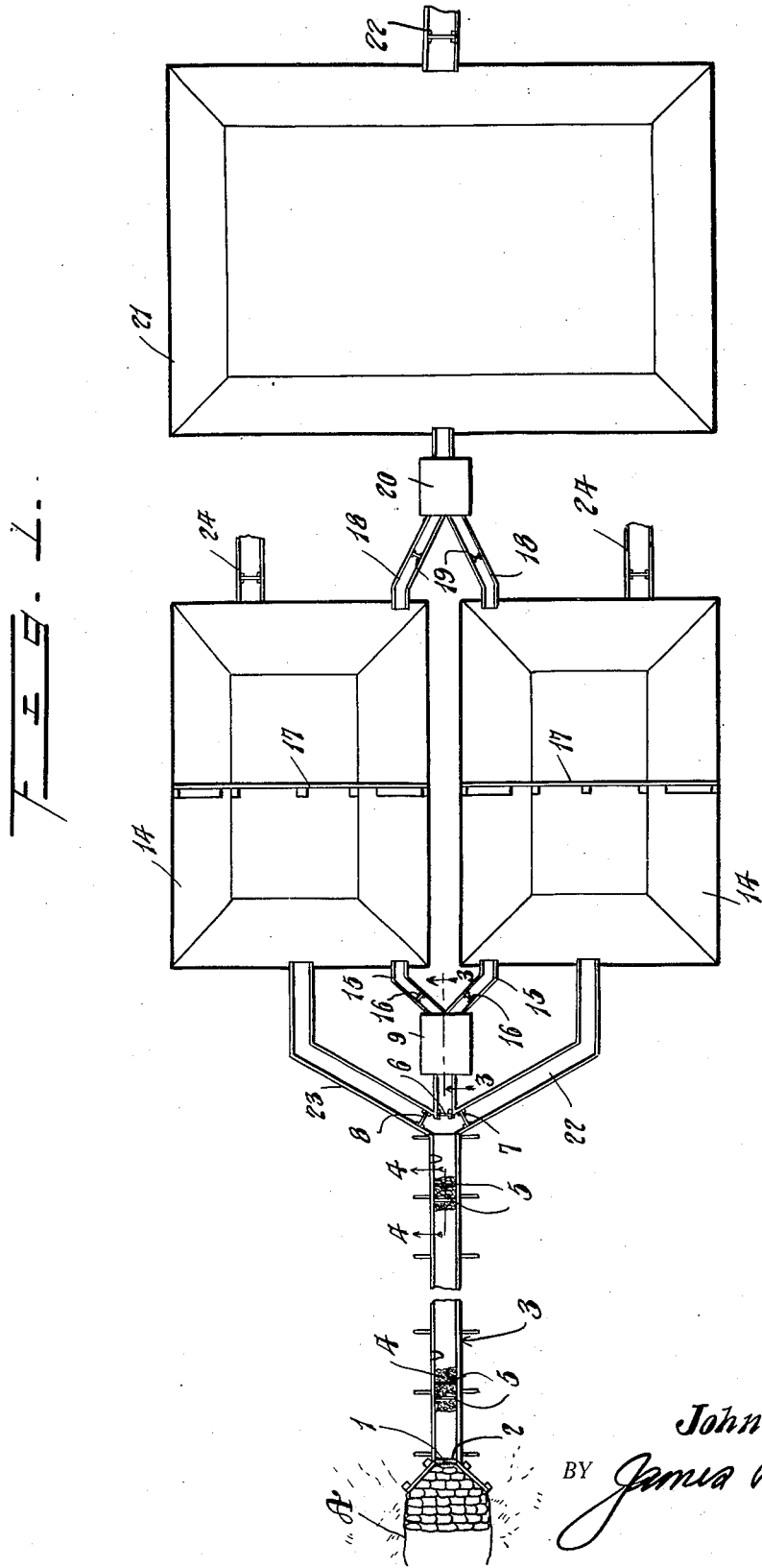

Patented Sept. 25, 1928.

1,685,300

UNITED STATES PATENT OFFICE.

JOHN T. TRAVERS, OF COLUMBUS, OHIO, ASSIGNOR, BY DIRECT AND MESNE ASSIGNMENTS, TO THE TRAVERS-LEWIS PROCESS CORPORATION, OF COLUMBUS, OHIO, A CORPORATION OF OHIO.

PROCESS AND APPARATUS FOR TREATING POLLUTED ACID WASTES.

Application filed June 21, 1927. Serial No. 200,491.

This invention relates to a process and apparatus for treating poluted acid wastes such as the acidified liquids emitted from mines and discharged from certain industrial plants such as steel mills. These acidified polluted liquids are very deadly to aquatic life and seriously pollute any stream or body of water into which they may be discharged. These acidified liquids are furthermore very destructive to apparatus used in handling them and frequently render the normal fresh water supply into which they are discharged unsuitable for municipal use or even as a supply for steam boilers. It also produces a corrosive action on concrete dams or abutments as well as on any iron or steel construction with which it may contact.

The process forming the subject matter of this invention specifically contemplates the subjection of the polluted acidified liquid to a treatment designed to render the same sufficiently pure to permit its discharge into any stream or body of water without danger to aquatic life and without placing any burden on the stream due to the oxygen demand of the polluted liquid.

To the end that the invention may be better understood, the nature of the acidified poluted liquids emitted from mines such as coal, copper, zinc, gold and silver mines, as well as the polluted acidified liquids discharged from steel mills in the manufacture of tin plate, tube wire, galvanized ware, enamel ware, high explosives and fertilizer will be described.

The chief polluting constitutents of these acidified wastes are sulphuric acid and metallic salts, usually salts of iron. The iron salts produce the red discoloration of the water and the acid kills the fish life of the stream into which these untreated waste liquids are discharged. The metallic salts are also injurious to aquatic life if in sufficient concentration. This process is accordingly with the removal and transformation of these polluting constituents to produce a purified effluent.

It is an object of the invention to provide an extremely flexible process since the character of the acidified liquid wastes treated will vary greatly depending upon local conditions. Where these wastes accumulate and stand for a period of time, the change in their character is very noticeable. This is due to the oxidation of the iron salts which is constantly going forward with the subsequent formation of the ferric salts which hydrolyze, forming ferric hydrate and sulphuric acid. As the ferrous salts are oxidized, the ferric salts formed undergo a partial hydrolysis. The ferrous sulphate is formed by oxidation of iron pyrites as follows:—

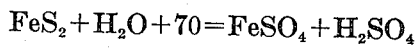
$$FeS_2 + H_2O + 7O = FeSO_4 + H_2SO_4$$

The iron pyrites contain more sulphur than is necessary to balance the iron when oxidized. Therefore, the sulphuric acid is formed.

The reaction for the oxidation of the ferrous sulphate to ferric sulphate is as follows:—

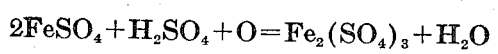
$$2FeSO_4 + H_2SO_4 + O = Fe_2(SO_4)_3 + H_2O$$

The ferric sulphate hydrolyzes as follows:—

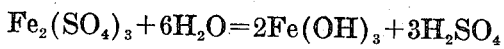
$$Fe_2(SO_4)_3 + 6H_2O = 2Fe(OH)_3 + 3H_2SO_4$$

Thus one molecule of ferric sulphate and six molecules of water produce two molecules of ferric hydrate and three molecules of sulphuric acid.

It will thus be seen that a process to cope effectively with these wastes must be sufficiently flexible to respond to the variations in character of the waste to be treated.

The ferric hydrate formed as above indicated causes a discoloration of the stream into which the waste is discharged and uses up the dissolved oxygen content of the stream in the oxidation of the ferrous salts to the point of saturation of ferrous iron. It is, therefore, essential to an efficient process, that this constituent be removed.

To the end that the operation of the process will be readily understood, reference is now made to the apparatus shown in the accompanying drawing forming a part of this specification.

In the drawing, Figure 1 is a plan view of one form of apparatus suitable for carrying out my process;

Figure 2 is a side elevation of the apparatus shown in Figure 1.

Figures 3 and 4 are detail views taken on lines 3—3 and 4—4 respectively of Figure 1.

Referring to the drawings, the polluted acidified waste liquid is fed from a source A through a suitable screen 1 to remove stones and foreign substances from the liquid. The liquid thence enters the upper end 2 of the inclined flume 3. The flume 3 is entirely filled with porous calcium carbonate such as lump travertine, as indicated at 4. At spaced intervals in the flume are positioned baffles 5 alternately extending downwardly from the top and upwardly from the bottom of the flume whereby the liquid is caused to contact with the entire mass of calcium carbonate in the flume. The dimensions of the flume and its inclination are important factors since it is essential that the period of contact between the acidified liquid and the calcium carbonate be accurately controlled for reasons hereinafter stated. In the normal operation of my process the waste liquid passes from the outlet end of the flume through a sluice gate 6, the gates 7 and 8 being closed, into the lower compartment 9ª of a treating house 9 having an upper compartment 10. The function of the treating house is to permit the introduction to the waste liquid subsequent to its travel through the calcium carbonate in the flume of a quantity of lime, the chemical effect of which will be hereinafter set forth. To this end there is positioned in the upper compartment 10 a suitable hopper 11 through which the lime may be introduced to the liquid in the lower compartment 9ª. An agitator 12 is positioned in the lower compartment 9ª and may be driven by a motor 13 located in the upper compartment 10. From the lower compartment 9ª the mixed waste liquid and lime in slight excess is delivered into one of the alternate settling tanks 14 through one of the alternate passageways 15, each provided with a suitable gate valve 16. The function of the settling tanks is to permit settling from the waste liquid of the constituents precipitated by the introduction of the lime and reactions effected during passage of the waste through the flume. Each of these settling tanks is provided with a centrally positioned cross baffle 17, under which the liquid must pass during its flow through the settling tank. The settling tanks or basins 14 may be underdrained with tile overlaid with sand and gravel, as indicated in Figure 2.

From either settling tanks or basins 14 the effluent is led through one of the conduits 18 provided with gate valves 19, and delivered to a second treating house 20 similar in structure to the treating house 9. The function of the treating house 20 is to permit the introduction to the effluent of a chemical reagent which will render the effluent suitable for use as a water supply for steam boilers and the like. From the treating house 20 the treated effluent is passed into a final collecting basin or tank 21 and is thence discharged through conduit 22 into the stream or withdrawn for use.

Describing now the chemical reactions which are effected in the process, it has already been stated that the polluting constituents to be altered and removed are the sulphuric acid and the metallic salts. By passing the acidified waste liquid through porous calcium carbonate and controlling the contact period of the waste with the calcium carbonate, the acid content is largely neutralized. The reaction is:

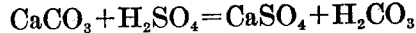
$$CaCO_3 + H_2SO_4 = CaSO_4 + H_2CO_3$$

The carbonic acid formed breaks up into water and carbon dioxide gas. The large surface offered the acid for reaction by the calcium carbonate in the form of lump travertine effects rapid neutralization. Furthermore some of the ferrous sulphate of the waste is oxidized during the passage of the waste through the travertine 4 in the flume 3 forming ferric sulphate which undergoes a partial hydrolysis with a subsequent precipitation of ferric hydrate.

It is important to control the time period during which the waste liquid is in contact with the calcium carbonate because if the period is too short adequate neutralization of the $H_2SO_4$ will not be effected, and if too long the ferric hydrate will deposit on the surface of travertine or porous calcium carbonate and thus destroy its effectiveness as a neutralizing agent. While the acidity of the particular waste and its content of iron salts will to some extent govern the time period required, I have found that best results are obtained by a time period of contact not less than two minutes nor more than five minutes.

As specifically illustrating the effects of time period of contact in treating a steel mill waste containing 3.92% sulphuric acid, 4.82% ferrous iron and .06% ferric iron with a contact period of four minutes, the content of acid was reduced 81% and the total iron content reduced 88.8% without depositing ferric hydrate on the surface of the travertine or porous calcium carbonate in the flume during prolonged use.

When treating the same waste with a period of contact in excess of five minutes, the acid content can be totally neutralized, but there occurs an objectionable deposit of ferric hydrate on the surface of the calcium carbonate which soon permits the waste to pass through the calcium carbonate without being neutralized.

The waste liquid, the acid content of which has been substantially neutralized by passage through the travertine or calcium carbonate in the flume, is subjected to the action of lime in slight excess. Generally speaking, one pound of lime to each 1,000 gallons of liquid will prove sufficient to produce the desired alkalinity, as it will be noted that the waste has been largely neutralized in the flume. The calcium hydroxide formed by the action of the lime on the water reacts with the remaining ferrous sulphate of the waste precipitating ferrous hydroxide. The liquid to which the lime has been added is permitted to settle for a short period in the tanks or basins 14 where its acid content is completely neutralized and the solids settle reducing the iron content to such a degree that it is negligible.

In some instances, the effluent from tanks 14 still has a noticeable content of calcium sulphate and magnesium sulphate. These constituents may be removed and the effluent made available as a water supply for industrial purposes or as feed water for steam boilers by subjecting the water to a final treatment in the treating house 20 with soda ash which yields a completely softened effluent.

In some operations, due to the low acidity and iron content of the waste liquid, it may be unnecessary to subject the waste to the action of lime, excepting when a softened effluent is desired. In such cases, the sluice gate 6 may be closed and the waste liquid delivered directly from the outlet of the flume to one of the tanks or basins 14 by suitably controlling the sluice gates 7 and 8 in the by-pass conduits 22 and 23 respectively. An analysis of the waste liquid leaving the flume will determine the desirability or necessity of the lime treatment.

Where the final effluent is not desired as a fresh water supply but is to be discharged directly into a stream, the final treatment with soda ash may be advantageously dispensed with. In this case the effluent is passed from the tanks 14 directly to the stream through the valve controlled outlets 24.

A typical mine waste such as my process is designed to treat shows upon analysis:—

Acidity as $H_2SO_4$ _____ 1127 P.P.M.
Iron as ferrous sulphate____ 960 P.P.M.
Sulphur as $SO_4$_____ 936 P.P.M.
Sul. unoxidized_____ 17.8 P.P.M.
Oxygen demand _____ 50.5 P.P.M.
Dilution necessary_____ 10 to 1.

This analysis is merely illustrative since, as heretofore stated, the waste will vary widely.

The above analyzed waste when treated in accordance with the invention by being passed through porous calcium carbonate with a time period of contact between two and five minutes and subsequently treated with lime, yielded an effluent showing the following on analysis:—

Acidity as $H_2SO_4$ _____ None
Iron as $FeSO_4$_____ 18 P.P.M.
Sulphur as $SO_4$_____ 860 P.P.M.
Unoxidized S _____ 17.8
Oxygen demand _____ 5
Ox. demand (aeration 10 min) _____ 0

The analysis of this waste subsequent to passage through the travertine or calcium carbonate and prior to treatment with lime showed:—

Acidity as $H_2SO_4$ _____ None
Iron as $FeSO_4$_____ 530 P.P.M.
Sulphur as $SO_4$_____ 890 P.P.M.
Sul. unoxidized_____ 17.8 P.P.M.
Oxygen demand _____ 28 P.P.M.
Ox. demand (aerated 15 min.)_____ 8 P.P.M.
Dilution necessary _____ 1

In this instance, the lime treatment could be dispensed with if the available dilution were sufficient to care for the remaining iron salts, but as stated, this is merely illustrative and usually the available dilution is small. Accordingly, in such instances the lime treatment is essential.

It will be understood that when the treatment with soda ash is employed to produce a softened effluent a preparatory lime treatment is given to the liquid so that the soda ash may properly function. In some instances the lime may be used in conjunction with soda ash treatment.

I desire it understood that the disclosure herein contained is merely illustrative and that I contemplate within the scope of my invention such changes and modifications as may be necessary to adapt the invention to the particular local conditions to permit its use.

I claim:—

1. A process for treating polluted acidified liquid wastes comprising passing the liquid waste through porous calcium carbonate and maintaining the time period of contact between the waste and the porous calcium carbonate in excess of two minutes and less than five minutes.

2. A process for treating a liquid characterized by its content of sulphuric acid and salts of iron comprising passing the liquid through porous calcium carbonate and so controlling the time period of contact between the liquid and calcium carbonate that ferric hydrate will not be deposited on the surface of the calcium carbonate.

3. A process for treating a polluted liquid characterized by its content of sulphuric acid and salts of iron comprising passing the liquid through a mass of porous calcium carbonate, so controlling the time period of contact between the liquid and the calcium carbonate that in excess of 75% of the acid content of the liquid is neutralized without depositing any substantial quantity of ferric hydrate on the surface of the calcium carbonate.

4. A process for treating an acidified liquid waste containing salts of iron comprising initially subjecting the waste to intimate contact with porous calcium carbonate for a controlled time period not in excess of five minutes, subsequently introducing to the liquid lime in slight excess, thereafter admitting the liquid to settling zone wherein it is maintained in a quiescent state to permit the precipitated matter to settle out, and removing the effluent from said settling zone.

5. A process for treating polluted acidified liquid wastes comprising passing the liquid waste through porous calcium carbonate and maintaining the time period of contact between the waste and the porous calcium carbonate in excess of two minutes and less than five minutes, and thereafter subjecting the liquid waste to the action of lime in slight excess.

6. A process for treating a liquid characterized by its content of sulphuric acid and salts of iron comprising passing the liquid through porous calcium carbonate and so controlling the time period of contact between the liquid and calcium carbonate that ferric hydrate will not be deposited on the surface of the calcium carbonate, and thereafter subjecting the liquid to the action of lime in slight excess to completely neutralize the remaining acid content thereof and to precipitate substantial quantities of the iron content.

7. An apparatus for treating acidified waste liquids comprising an elongated flume charged with porous calcium carbonate, a treating house, means for discharging liquid from said flume into said treating house, a pair of alternate settling basins, means for selectively delivering the liquid from said treating house to either of said basins, a pair of by-pass conduits connecting the outlet end of said flume directly to said basins whereby liquid may be passed from said flume directly to either basin without passage through said treating house, and means for discharging treated liquid from each of said basins.

JOHN T. TRAVERS.